United States Patent [19]

Gear et al.

[11] Patent Number: 5,170,252
[45] Date of Patent: Dec. 8, 1992

[54] SYSTEM AND METHOD FOR INTERCONNECTING AND MIXING MULTIPLE AUDIO AND VIDEO DATA STREAMS ASSOCIATED WITH MULTIPLE MEDIA DEVICES

[75] Inventors: Gary Gear, Scottsdale; Daniel M. Vincent, Phoenix; Todd Roper, Mesa; Glenn Williamson, Phoenix; John North, Scottsdale, all of Ariz.

[73] Assignee: Interactive Media Technologies, Inc., Scottsdale, Ariz.

[21] Appl. No.: 506,399

[22] Filed: Apr. 9, 1990

[51] Int. Cl.[5] .............................................. H04N 5/268
[52] U.S. Cl. ................................ 358/181; 340/825.25
[58] Field of Search .................. 358/181, 185, 160, 93; 340/825.25

[56] References Cited

U.S. PATENT DOCUMENTS

| | | | |
|---|---|---|---|
| 4,356,475 | 10/1982 | Neumann et al. | 358/181 |
| 4,488,179 | 12/1984 | Krüger et al. | 358/181 |
| 4,495,497 | 1/1985 | Molnár | 340/825.63 |
| 4,502,026 | 2/1985 | Imazeki et al. | 358/181 |
| 4,562,535 | 12/1985 | Vincent et al. | 364/200 |
| 4,575,759 | 3/1986 | Griepentrog et al. | 358/181 |
| 4,581,644 | 4/1986 | Deiss | 358/181 |
| 4,581,645 | 4/1986 | Beyers, Jr. | 358/181 |
| 4,647,973 | 3/1987 | Deiss | 358/181 |
| 4,746,982 | 5/1988 | Seen et al. | 358/181 |
| 4,855,730 | 8/1989 | Venners et al. | 340/825.25 |
| 4,907,085 | 3/1990 | Bingham | 358/181 |
| 4,949,171 | 8/1990 | Grandmougin | 358/93 |
| 4,989,081 | 1/1991 | Miyagawa et al. | 358/93 |
| 5,068,733 | 11/1991 | Bennett | 358/181 |

Primary Examiner—Howard W. Britton
Assistant Examiner—Jeffrey S. Murrell
Attorney, Agent, or Firm—Flehr, Hohbach, Test, Albritton & Herbert

[57] ABSTRACT

A system (10) has a pipeline (12) comprised of a multi-channel bi-directional video bus (14), multi-channel bi-directional audio bus (16), and a digital interprocessor communications bus (18). The pipeline (12) is equipped with a number of ports (20) where media controller (microprocessor) printed circuit cards (22) can be connected, thus providing a convenient method for connecting media devices (24) to the pipeline (12). In this manner, a media device's video input and output can be optionally connected to any of the video pipes (26) of the video bus (14). Similarly, the media device (24) audio inputs and outputs can be optionally connected to any of the audio bus (16) pipes (26). The switching is accomplished through a pair of analog multiplexers (28) whose connection options have been commanded by local microprocessor (30) resident on the media device microprocessor control board (22). The local microprocessor (30) receives instructions for the pipeline switch interconnections through the interprocessor serial communications bus (18). The pipeline (12) is constructed on a motherboard printed circuit board (32) that additionally contains a microprocessor (34) that serves as the local area network controller for the interprocessor communications. A software driver interconnects the multiple video and audio devices (24) in different configurations in response to user inputs to a host data processing system so that physical assignments of the device communications on the pipeline (12) are transparent to the user.

8 Claims, 13 Drawing Sheets

SYSTEM AND METHOD FOR INTERCONNECTING AND MIXING MULTIPLE AUDIO AND VIDEO DATA STREAMS ASSOCIATED WITH MULTIPLE MEDIA DEVICES

BACKGROUND OF THE INVENTION

1. Field of the Invention

The present invention relates generally to the interconnection of the audio and video data streams associated with multiple media devices. More particularly, it relates to a system and method for interconnecting multiple audio and video sources to multiple audio and video destinations concurrently, under computer control, and synchronously. The invention further allows for dynamic reconfiguration, synchronously concurrent with an external or internal timing pulse, especially for multi-media program creation and presentation, in tandem with a host computer. Further, the invention embodies a software driver, resident in the host computer, that facilitates a friendly user interface ideally suited for graphical control of the subject invention's functions.

2. Description of the Prior Art

Prior teachings generally deal with the interconnection of multiple media devices to a single destination, as would be the case in a conventional editing environment. For example, the following issued U.S. Patents disclose examples of such systems:

U.S. Pat. No. 4,502,026, issued Feb. 26, 1985 to Imazeki et al. describes a method of switching RF signals containing modulated video information from several sources to two possible destinations. Source to destination coupling is accomplished through a coupling transformer (balun coil) that serves to provide the necessary DC isolation and present the signal to the destination device as a balanced line.

The isolation method shows the importance of managing impedances when coupling a single source to two destinations. Switching is accomplished mechanically through slide switches, and because the information (video data) is modulated onto an RF carrier while being switched, there is minimal corruption of the video signal after it is extracted from the RF carrier.

U.S. Pat. No. 4,495,497, issued Jan. 22, 1985 to Molnar teaches a method of controlling the switching function associated with a data transmission path remotely through excitation and sense lines. Although the patent does not address video and audio data connectivity specifically, the data transmission lines and control signals are digital, and thus could be used for the routing of media video and audio information when digitally encoded.

The communications paths are treated as transmission lines, and as such, one would presume information could be routed over long distances. Molnar's treatment of transmission lines shows the need for careful impedance control and buffering to avoid signal distortion, or data errors.

U.S. Pat. No. 4,581,644, issued Apr. 8, 1986 to Deiss teaches a method of routing video between a monitor, auxiliary video source, and a video tape recorder (VTR). The bus is a single video channel with the necessary control logic to assure that the video signal is always terminated to prevent ghosting.

U.S. Pat. No. 4,647,973, issued Mar. 3, 1987 to Deiss teaches a switch method that assures that the video path is always terminated with a suitable impedance. This teaching is closely tied to U.S. Pat. No. 4,581,644, and is a refinement of the switching technique described therein. In both of these teachings, the switches are located in close proximity to the peripheral device to which it is connecting. This method requires that the video path be treated as a transmission line, and impedance matching becomes critical.

U.S. Pat. No. 4,746,982, issued May 24, 1988 to Seen teaches that a video bus can be used in such a way as to allow multiple destinations to be connected to a bus driven by one source. The specific implementation requires two video paths, one to provide the input path to a cross-over switch, and the other connected to the output of the cross-over switch to connect to several video destinations.

The cross-over switch is equipped with the necessary buffering to drive the video signal out the second video path. It is the second video path that can be connected to multiple device inputs.

The specific implementation described shows color video separated into its color components, RGB and Sync, for purposes of interconnecting on the video bus. Although RGBS separation has advantages when the video signal is being modified or otherwise adjusted, it is generally difficult to maintain correct color balance with total luminance because the three video paths (RGB) must be identical.

SUMMARY OF THE INVENTION

Accordingly, it is an object of this invention to provide a system and method for interconnecting and mixing multiple audio and video streams associated with multiple media devices in which the different interconnections are made by the system in response to user inputs with the physical connections being transparent to the user.

It is another object of the invention to provide such a system and method which will allow video production on a desktop system by a user who is not a trained video technician.

It is a further object of the invention to provide such a system and method in which the system is software reconfigurable, for example, when new multimedia devices are connected to the system.

The attainment of these and related objects may be achieved through use of the novel system for interconnecting and mixing multiple audio and video data streams associated with multiple media devices herein disclosed. A system for interconnecting and mixing multiple audio and video data streams associated with multimedia devices in accordance with this invention includes a data processing system. A plurality of audio and video devices are connected to a like plurality of media device communications boards. Each of the like plurality of media device communications boards is connected in an interprocessor control and signal transmission path between the data processing system and one of the plurality of audio and video devices. Each of the like plurality of media device communications boards has a control microprocessor, multiplex switching means controlled by the control microprocessor, video bus connections, audio bus connections and interprocessor control connections. Each of the like plurality of media device communications boards is connected by the connections to a mother board. The mother board has a pipeline consisting of a video bus, an audio bus and an interprocessor control bus. The video bus connections of each of the like plurality of media device communications boards is connected to the video bus. The audio connections of each of the like plurality of media device communications boards is connected to the audio bus. The interprocessor control connections of each of the like plurality of media device communications boards is connected to the interprocessor control bus. The mother board further includes a master control microprocessor connected to the interprocessor control bus.

In the method for interconnecting and mixing multiple audio and video data streams associated with multimedia devices, the multimedia devices are connected to a video pipeline, an audio pipeline and a control pipeline. A software driver is provided for managing physical assignments of the multimedia devices to the pipelines. User inputs are accepted specifying which of the multimedia devices are to be connected together. The multimedia devices are connected together in accordance with the user inputs, with the physical assignments of the multimedia devices to the pipelines being transparent to the user.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
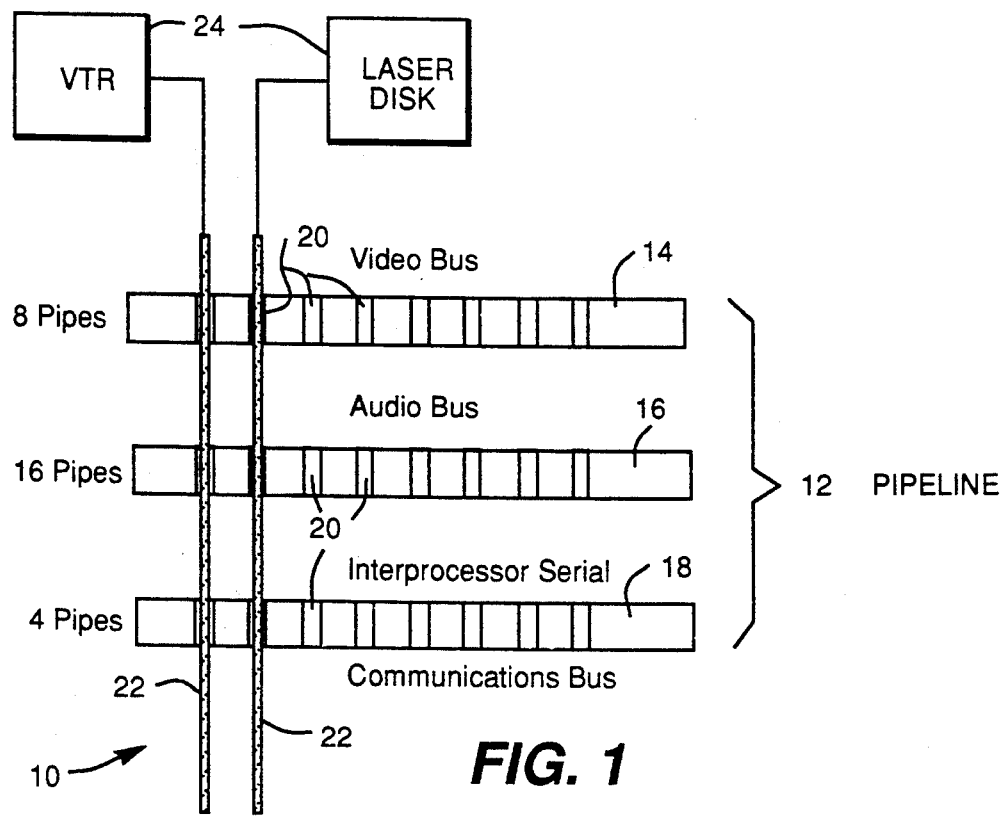
FIG. 1 is a block diagram of a system in accordance with the invention.
Figure 3:
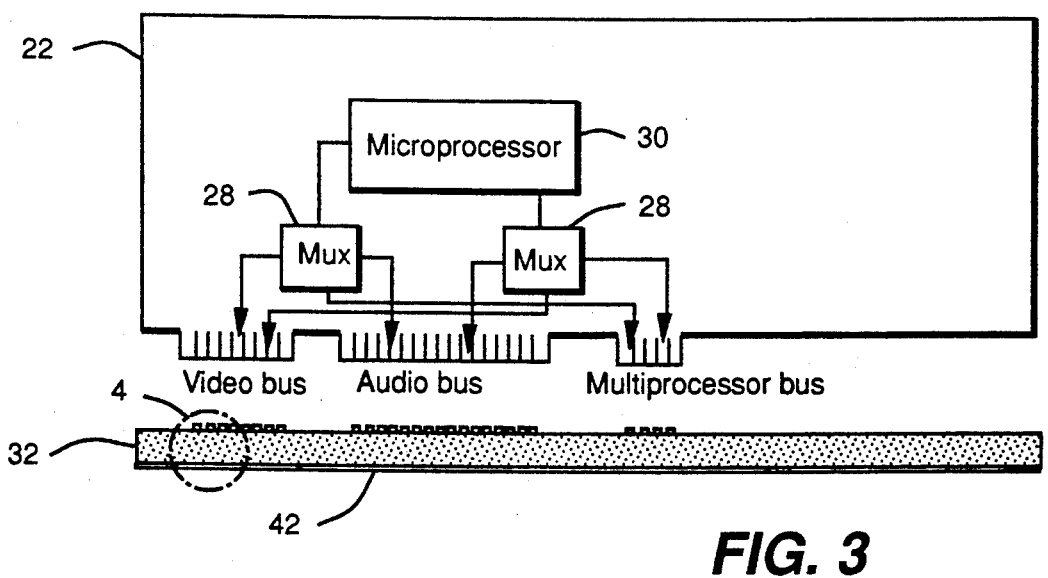
FIG. 3 is a cross-section view, taken along the line 3—3' in FIG. 2.
Figure 2:
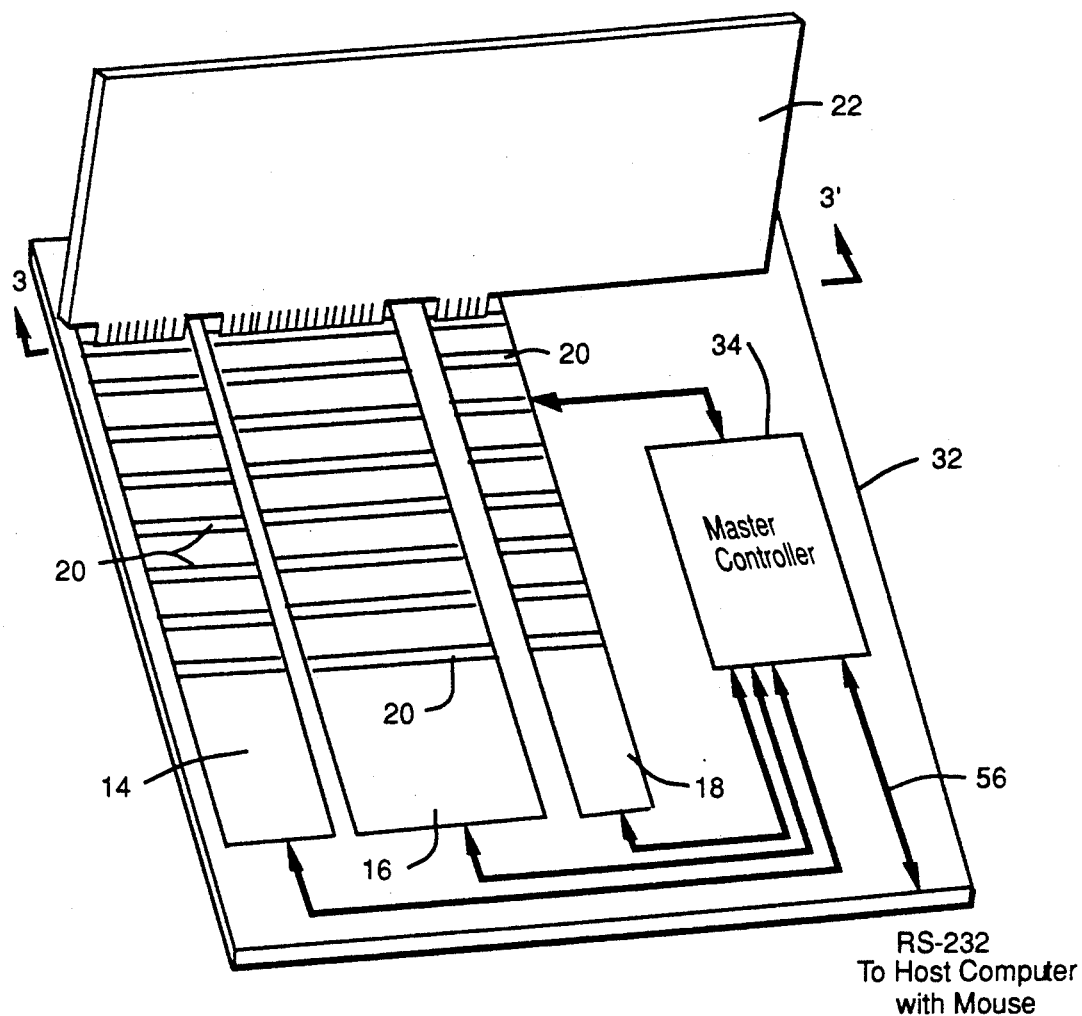
FIG. 2 is a perspective view of the system of FIG. 1.

Turning now to the drawings, more particularly to FIGS. 1–4, there is shown a system 10 having a pipeline 12 comprised of a multi-channel bi-directional video bus 14, multi-channel bi-directional audio bus 16, and a digital interprocessor communications bus 18. The pipeline 12 is equipped with a number of ports 20 where media controller (microprocessor) printed circuit cards 22 can be connected, thus providing a convenient method for connecting media devices 24 to the pipeline 12.

In this manner, a media device's video input and output can be optionally connected to any of the video pipes 26 of the video bus 14. Similarly, the media device 24 audio inputs and outputs can be optionally connected to any of the audio bus 16 pipes 26. The switching is accomplished through a pair of analog multiplexers 28 whose connection options have been commanded by local microprocessor 30 resident on the media device microprocessor control board 22. The local microprocessor 30 receives instructions for the pipeline switch interconnections through the interprocessor serial communications bus 18.

Novel elements of this system 10 are (1) the unique inclusion of video data channels, audio channels, and a serial interprocessor communications channel in a single integrated structure, the pipeline 12, (2) unique pipeline 12 design methodology that allows for the construction and interconnection of multiple media devices so as not to introduce distortion and interference, and (3) a pipeline software driver that manages the assignment of the pipes 26 for the various media interconnect functions such that the physical pipeline 12 assignments become transparent to the user.

The pipeline 12 is constructed on a motherboard printed circuit board 32 that additionally contains a microprocessor 34 that serves as the local area network controller for the interprocessor communications. The motherboard 32 is the foundation circuit to which all other circuits will connect. The basic components of the motherboard 32 are the video bus 14, audio bus 16, the interprocessor serial communications bus 18, and the master control microprocessor 34. The master control microprocessor 34 can be thought of as the central clearing house for instructions and responses to and from a host PC, and the microprocessors 30 connected to the interprocessor communications network.

The interprocessor serial network contains two other control signals, one being the master video sync pulse used to synchronize video and audio switching events with the video vertical blanking pulse. The other signal is provided on an interprocessor interrupt line of the bus 18. This signal line allows for the synchronization of events that are to be executed by different microprocessors connected to the interprocessor serial communications bus 18. It is the inclusion of this interprocessor interrupt that allows for multiple events executed by different controller microprocessors 30 to occur within the vertical blanking interval.

The video bus 14 is a series of analog video channels or conductive pipes 26, with the motherboard 32 forming the structure upon which the bus 14 is constructed. The video bus signal paths or conductive pipes 26 contain interdigitated ground lines 40 to minimize crosstalk, and the back side of the motherboard 32 forms a ground plane 42 to minimize other electromagnetic interference. Both ends of the bus 14 are terminated to provide a low impedance path to ground. Reflections and harmonics are minimized through the unique design and physical layout of the pipes 26. The video bus 14 is designed to handle 10 MHz. video. The number of pipeline channels is 8.

The audio pipeline 16 is a series of analog audio channels or pipes 26, the motherboard 32 also forming the structure upon which the bus 16 is constructed. The audio bus 16 signal paths or pipes 26 contain interdigitated ground lines 40 to minimize crosstalk, and the back side of the motherboard forms a ground plane 42 to minimize other electromagnetic interference, as in the video bus 14. Both ends of the bus 16 are terminated to provide a low impedance path to ground. Reflections and harmonics are minimized through the unique design and physical layout of the pipes 26. In addition to the audio channels, the audio pipeline 16 includes an analog power distribution bus. The number of pipeline channels 26 is 16. The audio pipeline 16 has 22 KHz of audio bandwidth with +/− 1 db, linearity minimum. In an alternative construction for the motherboard, as shown in FIG. 4A, an insulating layer 41 is added over the pipes 26 and interdigitated ground lines 40, with a second ground plane 43 provided on top of the insulating layer 41. This construction is especially suited for an all digital video and audio signal system.

Although the system 10 routes video and audio signals in analog form, the video and audio pipelines 14 and 16 have sufficient bandwidth to route video and audio in serial digital form.

The critical portion of the pipeline 12 design is associated with the video pipes 26. The circuit board traces 26 were designed to minimize the distributed capacitance and inductance normally associated with a transmission line. The preferred implementation of this invention requires that the pipeline 12 be designed to minimize the transmission line characteristics, thus resulting in an interconnect path that behaves electrically more like a short piece of wire than a true transmission line.

The buffers that drive the individual pipes 26 were selected to provide the lowest reasonable output impedance, and similarly, terminating resistors at each end of the pipe 26, in parallel provide the lowest impedance load these buffers could reasonably be expected to drive. Specifically, no attempt was made to match the output impedance of the buffer to the impedance of the pipe. Such a match would result in a pipe configuration that would not suitably couple a single source to multiple destinations physically located different distances down the pipe from the source. Further, matching impedances would require the transmission distance to be the same for all paths, thus greatly restricting the utility of the pipeline 12 concept.

Figure 4:
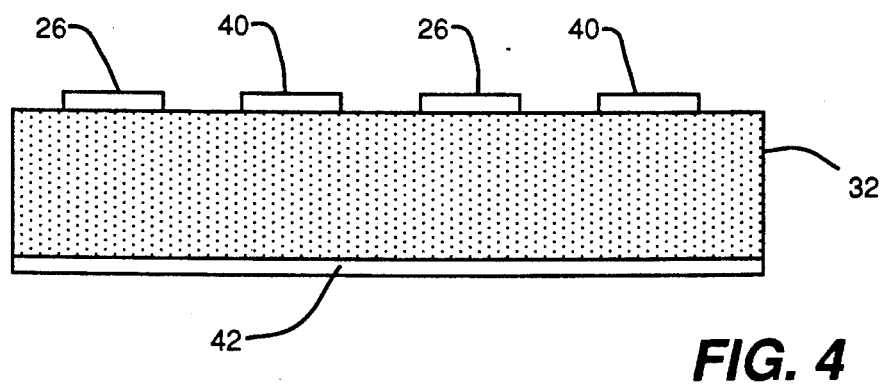
FIG. 4 is an enlarged view of area 4 in FIG. 3.
Figure 4A:
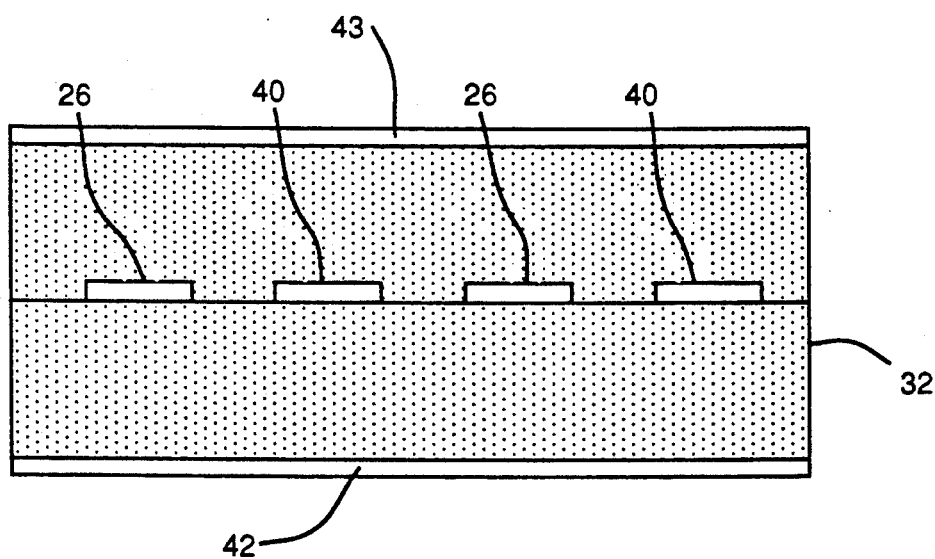
FIG. 4A is a view corresponding to FIG. 4, but of a corresponding portion of an alternative embodiment of the invention.
Figure 4B:
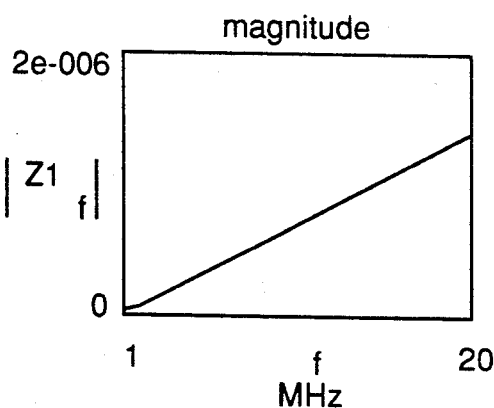
FIGS. 4B–4G are graphs of impedance characteristics for the structures shown in FIGS. 4 and 4A.
Figure 4C:
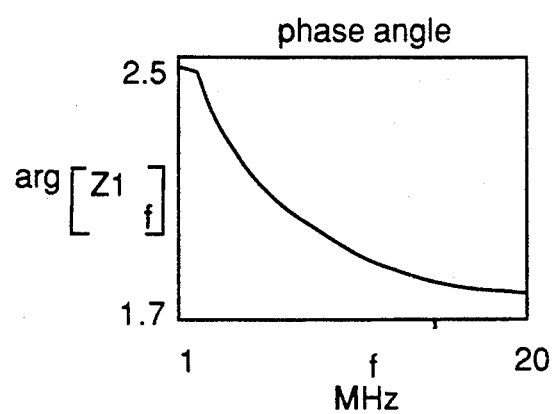
Figure 4D:
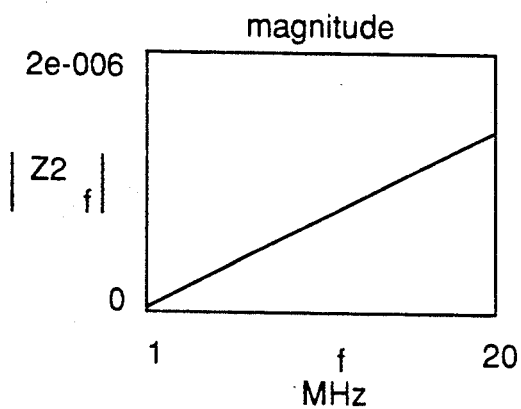
Figure 4E:
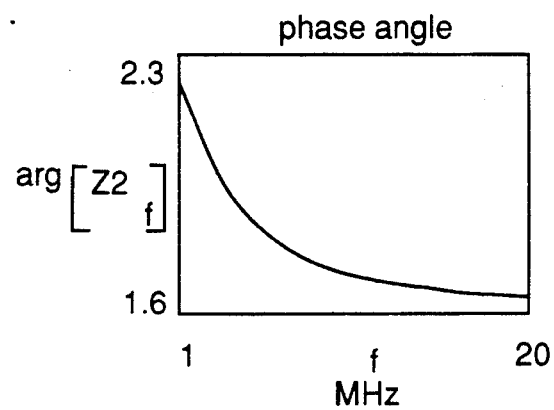

A mathematical model of the pipes 26 structure as shown in FIGS. 4 and 4A is presented in Table 1 below and in FIGS. 4B–4E. Two models are presented. The first has signal traces on the top side of the printed circuit board with a ground plane on the bottom. It is referred to as the "ground plane only model." The second has signal traces separated by ground traces on the top side of the board with a ground plane on the bottom, and is the specific structure shown in FIG. 4. It is referred to as the "ground plane with parallel traces" model.

TABLE 1

Variables used:

| | | units: |
|---|---|---|
| Trace Length: | $Tl := 12$ | inch |
| Trace width: | $Tw := .015$ | inch |
| Trace Thickness: | $Th := .00165$ | inch |
| Trace to trace spacing: | $Ts := .063$ | inch |
| PCB Thickness: | $Bd := .093$ | inch |

Constants used:

| | | | |
|---|---|---|---|
| Dielectric constant PCB: | $Kb := 4.55$ | | Connector Capacitance: |
| Dielectric constant SM: | $Km := 3.75$ | | |
| Low end frequency: | $f0 := 1000000$ | Hz | |
| Center frequency: | $f1 := 10000000$ | Hz | $Cc := 6.67 \cdot 10^{-12}$ |
| High end frequency: | $f2 := 100000000$ | Hz | |
| Frequency range: | $f := 1 \ldots 20$ | MHz | |

Trace Resistance $\Omega$/inch:

$$Ri := \frac{4.318 \cdot 10^{-9}}{Tw \cdot Th} \qquad Ri = 0.000174 \text{ ohm}$$

Trace Inductance H/inch: $\quad Li := 5.1 \cdot 10^{-12} \quad$ Henry

OPEN SIGNAL TRACES (not terminated)

Capacitance Trace to backplane:

$$Cb := \left[ .031 \cdot \left[ \frac{Th}{Tw} \right] + \left[ .023 \cdot (1 + Kb) \cdot \log \left[ 1 + \left[ \frac{2 \cdot Tw}{Bd} \right] + 2 \cdot Tw + \left[ \frac{Tw^2}{Bd^2} \right] \right] \right] \right] \cdot 10^{-12}$$

$Cb = 2.12091 \, 10^{-14}$ F/inch

Capacitance Trace to Trace:

$$Cs := \left[ .031 \cdot \left[ \frac{Tw}{Th} \right] + \left[ .023 \cdot (1 + Km) \cdot \log \left[ 1 + \left[ \frac{2 \cdot Th}{Ts} \right] + 2 \cdot Th + \left[ \frac{Th^2}{Ts^2} \right] \right] \right] \right] \cdot 10^{-12}$$

$Cs = 2.844199 \, 10^{-13}$ F/inch

Characteristics Series Impedance with ground plane only:

$Ctl := Cb \cdot 12 + Cc \qquad Lt := Li \cdot 12$ at f0: at f1: at f2:

$$Xc10 := \left[ \frac{1}{2 \cdot \pi \cdot f0 \cdot Ctl} \right] \qquad Xc11 := \left[ \frac{1}{2 \cdot \pi \cdot f1 \cdot Ctl} \right] \qquad Xc12 := \left[ \frac{1}{2 \cdot \pi \cdot f2 \cdot Ctl} \right]$$

| $Xc10 = 2.298429 \, 10^4$ | $Xc11 = 2298.429212$ | $Xc12 = 229.842921$ |
|---|---|---|
| $Xl10 := 2 \cdot \pi \cdot f0 \cdot Lt$ | $Xl11 := 2 \cdot \pi \cdot f1 \cdot Lt$ | $Xl12 := 2 \cdot \pi \cdot f2 \cdot Lt$ |
| $Xl10 = 0.000385$ | $Xl11 = 0.003845$ | $Xl12 = 0.038453$ |

$$Z10 := \frac{Ri + j \cdot Xl10}{\left[ \frac{1}{Ri} \right] + \frac{1}{j} \cdot Xc10} \qquad Z11 := \frac{Ri + j \cdot Xl11}{\left[ \frac{1}{Ri} \right] + \frac{1}{j} \cdot Xc11} \qquad Z12 := \frac{Ri + j \cdot Xl12}{\left[ \frac{1}{Ri} \right] + \frac{1}{j} \cdot Xc12}$$

$Z10 = -1.396851 \, 10^{-8} + 1.107407 \, 10j^{-8} \qquad Z12 = -2.381946 \, 10^{-7} + 6.699154 \, 10j^{-6}$
$\qquad\qquad\qquad Z11 = -2.055292 \, 10^{-7} + 5.884545 \, 10j^{-7}$ Magnitude:

| $|Z10| = 1.782567 \, 10^{-8}$ | $|Z11| = 6.233144 \, 10^{-7}$ | $|Z12| = 6.703387 \, 10^{-6}$ |

Phase angle:

TABLE 1-continued arg(Z10) = 2.471265    arg(Z11) = 1.90682    arg(Z12) = 1.606337

$$X11_f = 2 \cdot \pi \cdot Lt \cdot f \cdot 10^6 \qquad Xc1_f = \frac{1}{2 \cdot \pi \cdot Ct1 \cdot f \cdot 10^6} \qquad Z1_f = \frac{Ri + j \cdot X11_f}{\left[\frac{1}{Ri}\right] + \frac{1}{j} \cdot Xc1_f}$$

Characteristic Series Impedance with ground plane and parallel ground traces:
$$Ct2: = 12 \cdot (Cb + (2 \cdot Cs)) + Cc$$

at f0:  at f1:  at f2:

$$Xc20: = \left[\frac{1}{2 \cdot \pi \cdot f0 \cdot Ct2}\right] \qquad Xc21: = \left[\frac{1}{2 \cdot \pi \cdot f1 \cdot Ct2}\right] \qquad Xc22: = \left[\frac{1}{2 \cdot \pi \cdot f2 \cdot Ct2}\right]$$

$$Z20: = \frac{Ri + j \cdot X110}{\left[\frac{1}{Ri}\right] + \frac{1}{j} \cdot Xc20} \qquad Z21: = \frac{Ri + j \cdot X111}{\left[\frac{1}{Ri}\right] + \frac{1}{j} \cdot Xc21} \qquad Z22: = \frac{Ri + j \cdot X112}{\left[\frac{1}{Ri}\right] + \frac{1}{j} \cdot Xc22}$$

$$Z20 = -2.068519 \cdot 10^{-8} + 2.531692 \cdot 10_j^{-8} \quad Z22 = -1.049899 \cdot 10^{-7} + 6.706585 \cdot 10_j^{-6}$$
$$Z21 = -1.009176 \cdot 10^{-7} + 6.50492 \cdot 10_j^{-7}$$

Magnitude:
$|Z20| = 3.269287 \cdot 10^{-8}$    $|Z21| = 6.582737 \cdot 10^{-7}$    $|Z22| = 6.707407 \cdot 10^{-6}$ Phase angle:
arg(Z20) = 2.255847    arg(Z21) = 1.72471    arg(Z22) = 1.58645

$$X12_f = 2 \cdot \pi \cdot Lt \cdot f \cdot 10^6 \qquad Xc2_f = \frac{1}{2 \cdot \pi \cdot Ct2 \cdot f \cdot 10^6} \qquad Z2_f = \frac{Ri + j \cdot X12_f}{\left[\frac{1}{Ri}\right] + \frac{1}{j} \cdot Xc2_f}$$

The characteristic impedances listed above are the equivalent total impedance values seen by the source at the three frequencies. They are based on unterminated traces only.

The transmission line characteristics of each trace are listed below in the embedded microstrip calculations of Table 2. These values represent the equivalent impedance of an infinitely long line for each type of layout. Because the physical length of the pipeline 12 in the preferred embodiment is less than one quarter of the wavelength of the signals being transferred on the pipeline, these figures have little practical meaning in the preferred embodiment.

TABLE 2

Ground plane only:

$$Zo1: = \left[\frac{87}{\sqrt{Kb + 1.41}}\right] \cdot \ln\left[\frac{4 \cdot Bd}{.067 \cdot \pi \cdot Tw \cdot \left[.8 + \frac{Th}{Tw}\right]}\right]$$

Zo1 = 173.318089

Ground plane and parallel traces:

TABLE 2-continued $$Zo2: = \left[\frac{87}{\sqrt{Kb + 1.41}}\right] \cdot \ln\left[\frac{5.98 \cdot Bd}{(.8 \cdot Tw) + Th}\right]$$

Zo2 = 132.114831

Propogation delay: (The same for both models)

$$t_{pd}: = 1.017 \cdot \sqrt{.47 \cdot Kb + .67} \qquad t_{pd} = 1.704348 \text{ ns per foot}$$

Resonant Frequency:

$$FR1: = \frac{1}{2 \cdot \pi \cdot \sqrt{Lt \cdot Ct1}} \qquad FR2: = \frac{1}{2 \cdot \pi \cdot \sqrt{Lt \cdot Ct2}}$$

$FR1 = 7.731254 \cdot 10^9$    $FR2 = 5.486353 \cdot 10^9$

Signals are capacitively coupled to the trace next to them. If that trace is a ground plane, as in FIG. 4, then the coupling is negligible. For the ground plane only model, the capacitive coupling is calculated as shown in Table 3.

TABLE 3

$$Cc: = \left[.031 \cdot \left[\frac{Tw}{Th}\right] + \left[.023 \cdot (1 + Kb) \cdot \log\left[10 \cdot \left[1 + \left[\frac{2 \cdot Th}{.05}\right] + 2 \cdot Th + \left[\frac{Th^2}{.05^2}\right]\right]\right]\right]\right] \cdot 10^{-12}$$

Cc1: = Cc · 12
Cc1 = 4.95887 · 10$^{-12}$ Farads of capacitive coupling signal to signal $$Xc: = \left[\frac{1}{2 \cdot \pi \cdot f1 \cdot Cc1}\right]$$

Xc = 3209.50017 ohms of reactance at 10 Mhz between signal traces

Assuming the transmission line characteristic impedance for the ground plane only model, the induced signal magnitude can be estimated as shown in Table 4.

TABLE 4

$V_s = 1$ volt p-p $$V_{ind} = \frac{V_s \cdot Z_{o1}}{Z_{o1} + X_c} \quad V_{ind} = 0.051235$$

The $V_{ind}$ value listed above is the induced voltage due to capacitive coupling only. It does not include electromagnetic coupling.

Thermal noise calculations for the models are as shown below in Table 5.

TABLE 5

| | | |
|---|---|---|
| Boltzmann's Constant | $k: = 1.3803 \cdot 10^{-23}$ | |
| Noise in watts: | $N: = k \cdot 298.2 \cdot 10^7$ | $N = 4.116055 \, 10^{-14}$ |
| INDUCED | Ground plane only: | Ground plane and parallel traces: |
| Current | $I1: = \sqrt{\frac{N}{Z_{o1}}}$ | $I2: = \sqrt{\frac{N}{Z_{o2}}}$ |
| | $I1 = 1.541057 \, 10^{-8}$ | $I2 = 1.765082 \, 10^{-8}$ |
| Voltage | $E1: = I1 \cdot Z_{o1}$ | $E2: = I2 \cdot Z_{o2}$ |
| | $E1 = 2.67093 \, 10^{-6}$ | $E2 = 2.331935 \, 10^{-6}$ |

The electrical characteristics of the pipeline 12 are summarized below in Table 6.

TABLE 6

| Ground Plane Only model: | | |
|---|---|---|
| Tx Line impedance: | $Z_{o1} = 173.318089$ | ohms |
| Resonant Frequency: | $FR1 = 7.731254 \, 10^9$ | Hz |
| Coupled Voltage: | $V_{ind} = 0.051235$ | volts |
| Thermal Noise: | $E1 = 2.67093 \, 10^{-6}$ | volts |
| Ground Plane with Parallel Ground Traces model: | | |
| Tx Line impedance: | $Z_{o2} = 132.114831$ | ohms |
| Resonant Frequency: | $FR2 = 5.486353 \, 10^9$ | Hz |
| Thermal Noise: | $E2 = 2.331935 \, 10^{-6}$ | volts |

Figure 4F:
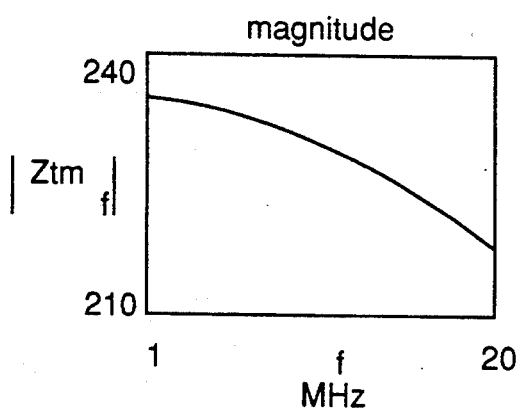
Figure 4G:
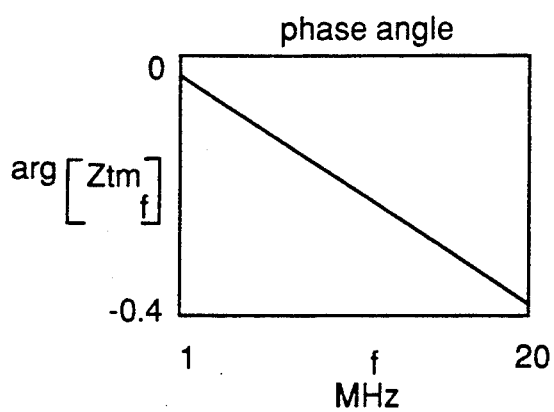

The pipes 26 are terminated at both ends of the pipeline 12 with equal resistances. The characteristics of such termination as shown below in Table 7 and in FIGS. 4F and 4G for the ground plane with parallel ground traces model, as shown in FIG. 4.

TABLE 7

Termination resistance: $R_t: = 470$ ohms $$Ztm_f = \left[ R_i + j \cdot X12_f + \frac{-j \cdot Xc2_f \cdot \frac{R_t}{2}}{-j \cdot Xc2_f + \frac{R_t}{2}} \right] \quad \arg[Ztm_{20}] = -0.385694$$

Figure 5A:
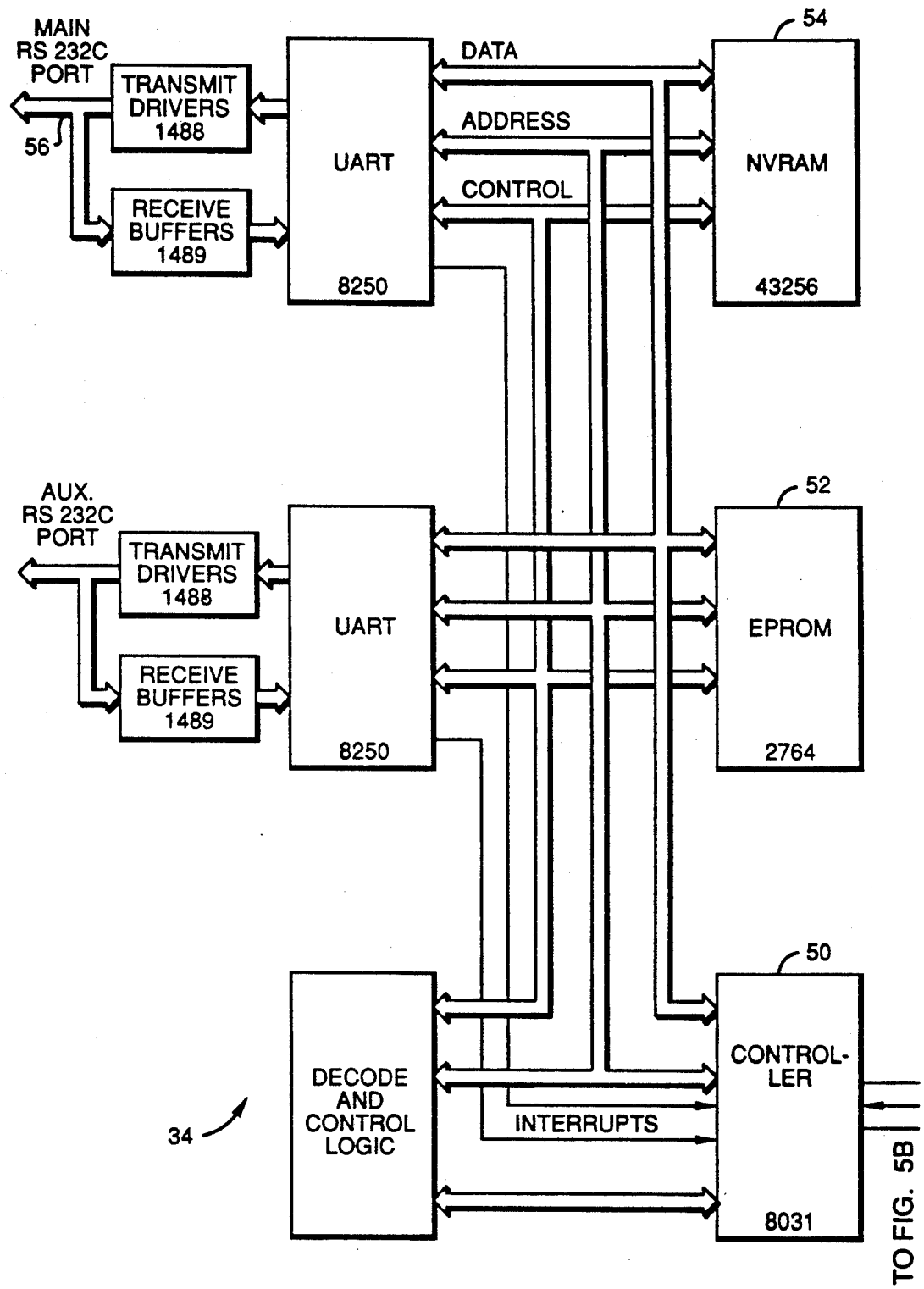
FIGS. 5A–8C are more detailed block diagrams of the system of FIGS. 1–4.
Figure 5B:
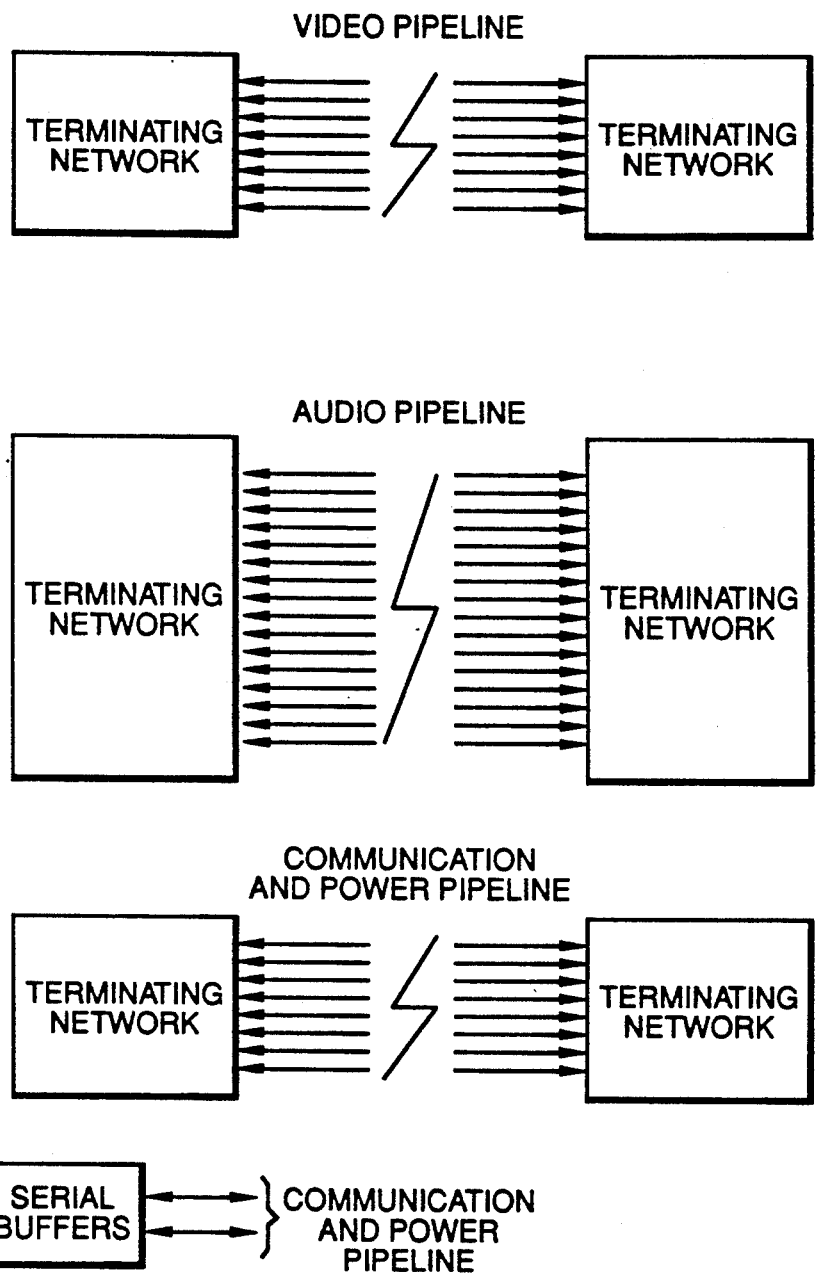

Further details of the system are provided in FIGS. 5A–8B. The master controller 34 is shown in FIGS. 5A and 5B. All communications between the host microcomputer and the multimedia devices 24 are controlled by microprocessor 50 and are carried out through the microprocessors 30 on the media controller cards 22. The microprocessor 50 is an 8051 series processor equipped with a BIOS EPROM 52 for network and serial communications and a non-volatile RAM 54 for program memory. Serial communications with a host microcomputer, such as an Apple Macintosh, is through RS-232 port 56. A software driver for the microprocessor 50 is downloaded from the host microcomputer to RAM 54, where it resides until changes are necessary in it, such as the addition of new devices 24 to the system 10.

Figure 6A:
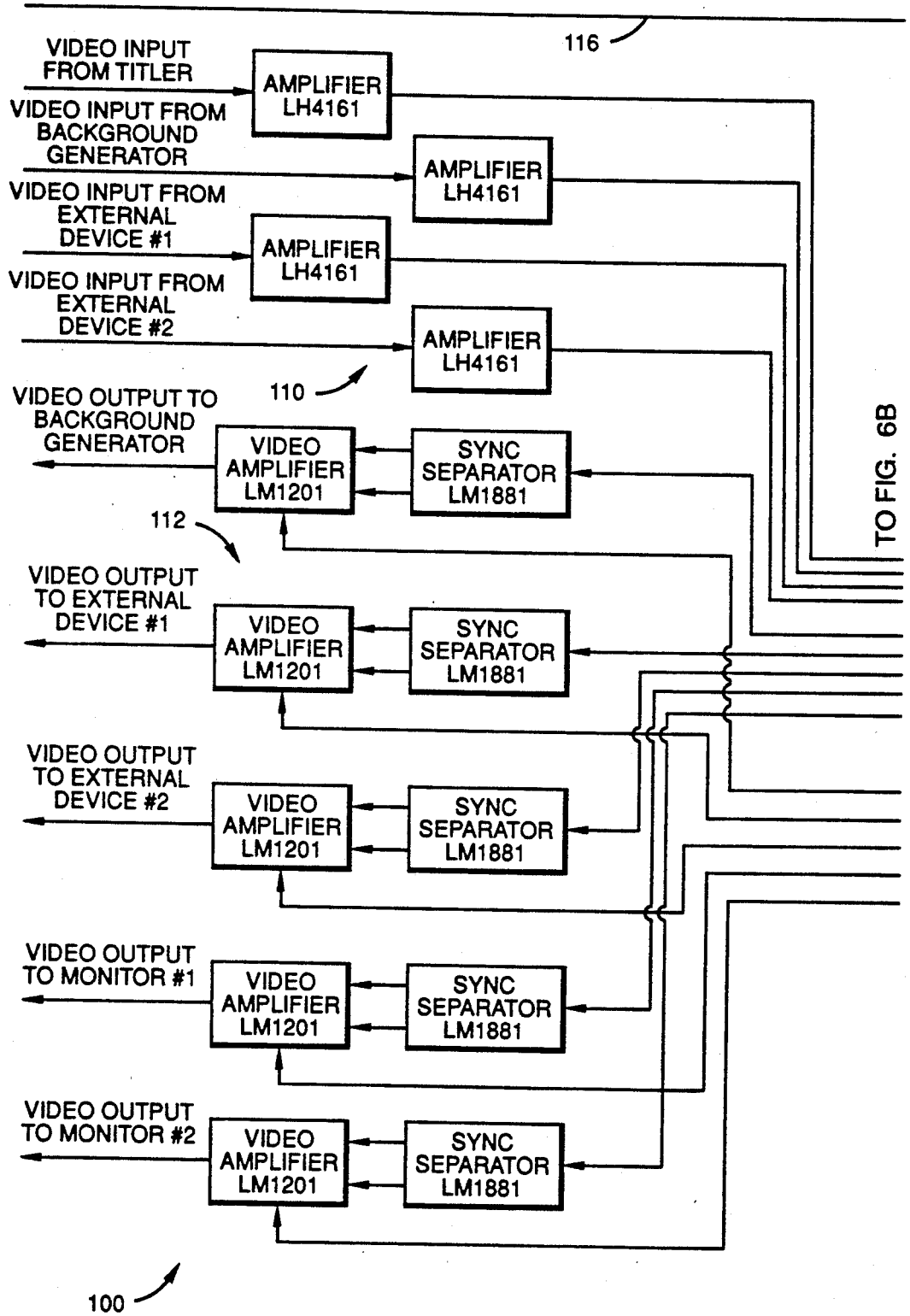
Figure 6B:
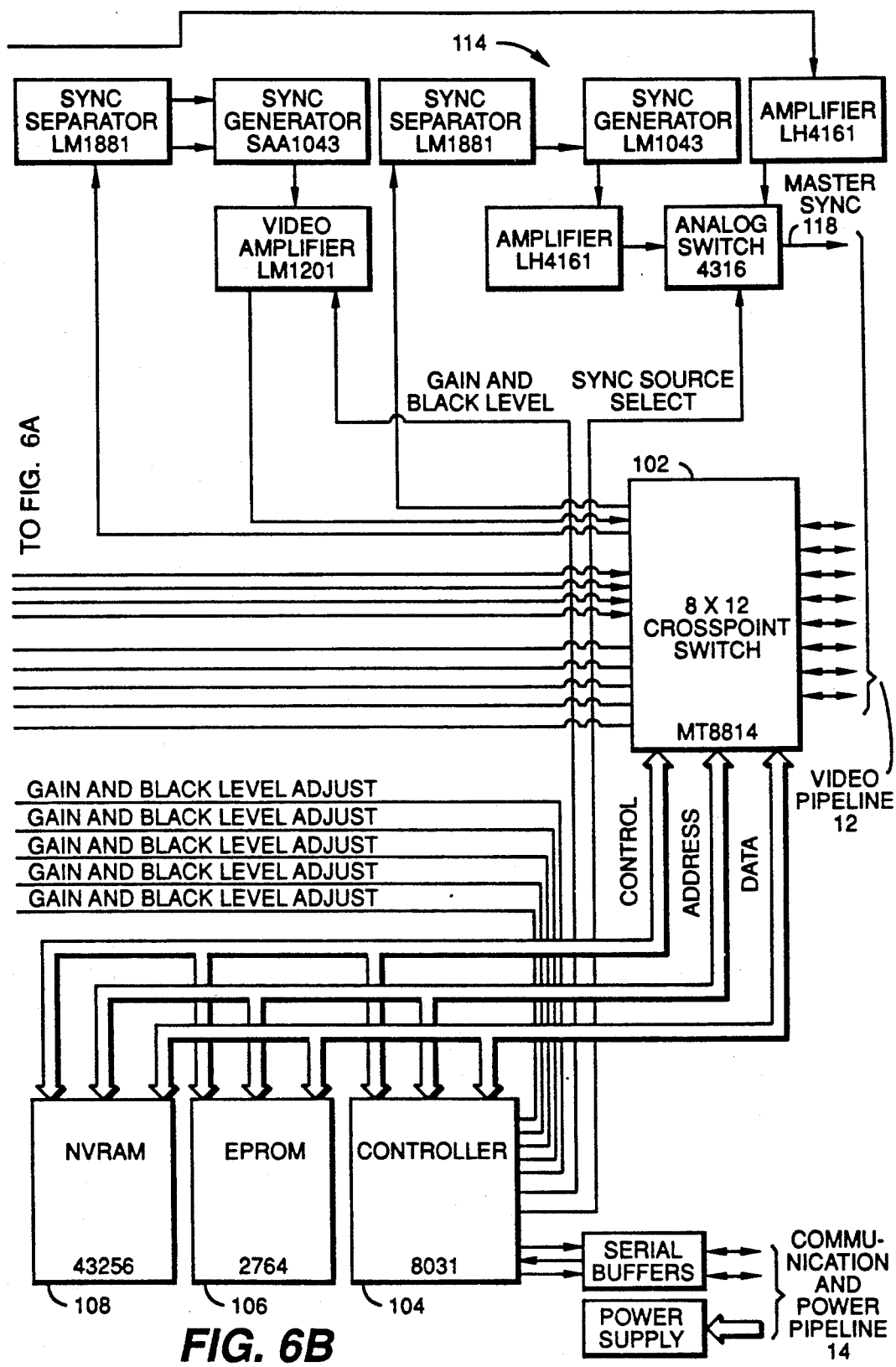

Video controller 100 is shown in FIGS. 6A and 6B. The video controller 100 attaches to the video pipeline 14 and the interprocessor communications pipeline 18 and is provided on a circuit card similar to the device controller cards 22. The video controller 100 has a video crosspoint switch 102 controlled by microprocessor 104 for connecting the video devices 24 in different ways through their device cards 22 for transmission of video signals among them as well as to and from the host microcomputer. The microprocessor 104 is also an 8051 series processor equipped with a BIOS EPROM 106 for network communications and a non-volatile RAM 108 for program memory. Auxiliary video input and output devices 110 and 112 are connected to the video switch 102. Video sync circuits 114 are also connected to the video switch 102 and the video pipeline 12. The video sync circuits 114 reconstruct a defective or cobbled sync signal, such as with the output of a still frame. An external sync input at 116 is software switchable to master sync line 118. The video sync circuits 114 include a sync separator, so that any chosen video signal can be designated master sync. There is also a separate, independent sync generator that can be software switched to the master sync line 118. In this mode, all video devices will be slaved to the independent source originating on the video controller 100. If an unacceptable sync signal or lack of sync signal occurs, then the system can be switched to the internal sync to provide as smooth a transition as possible.

Figure 7A:
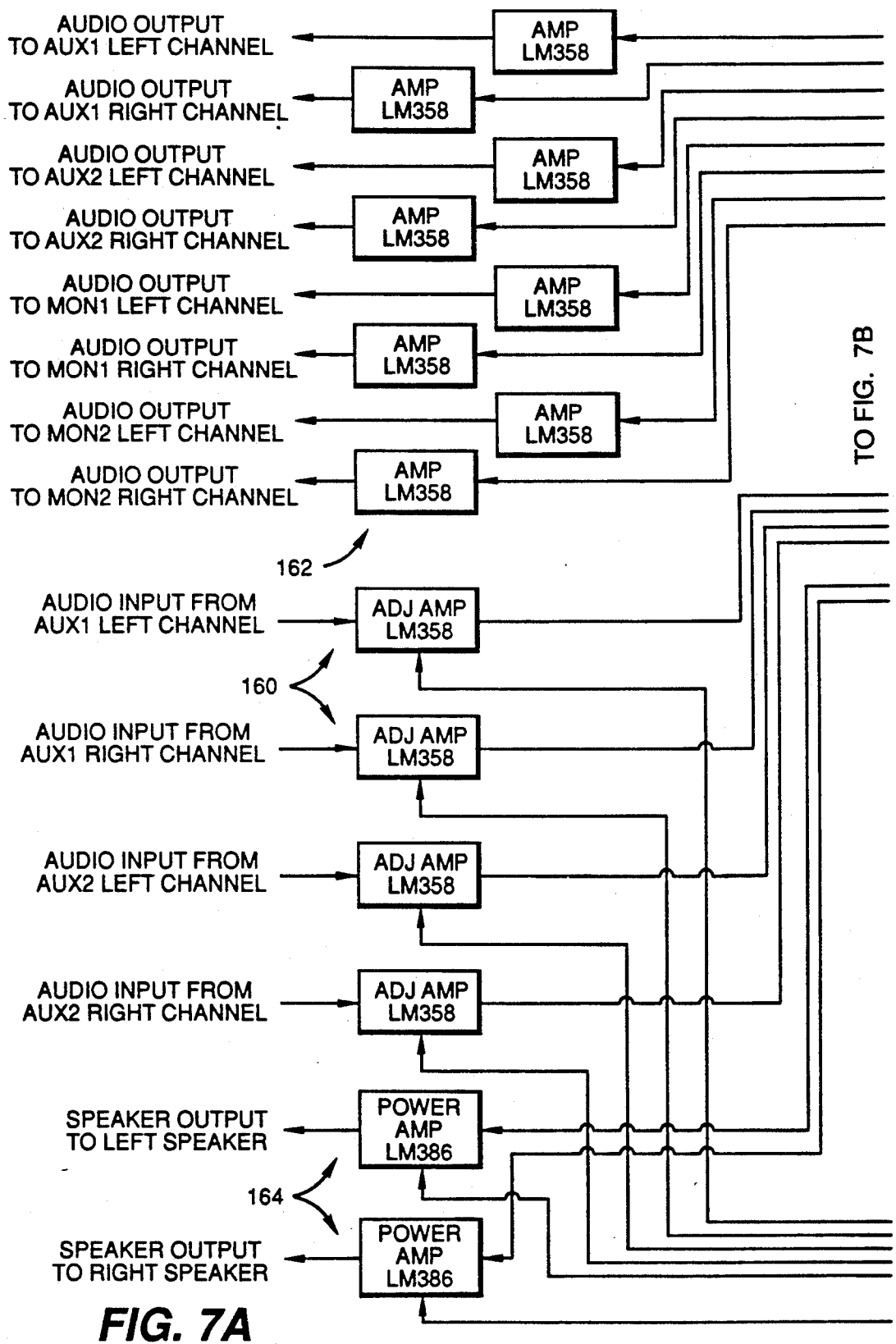
Figure 7B:
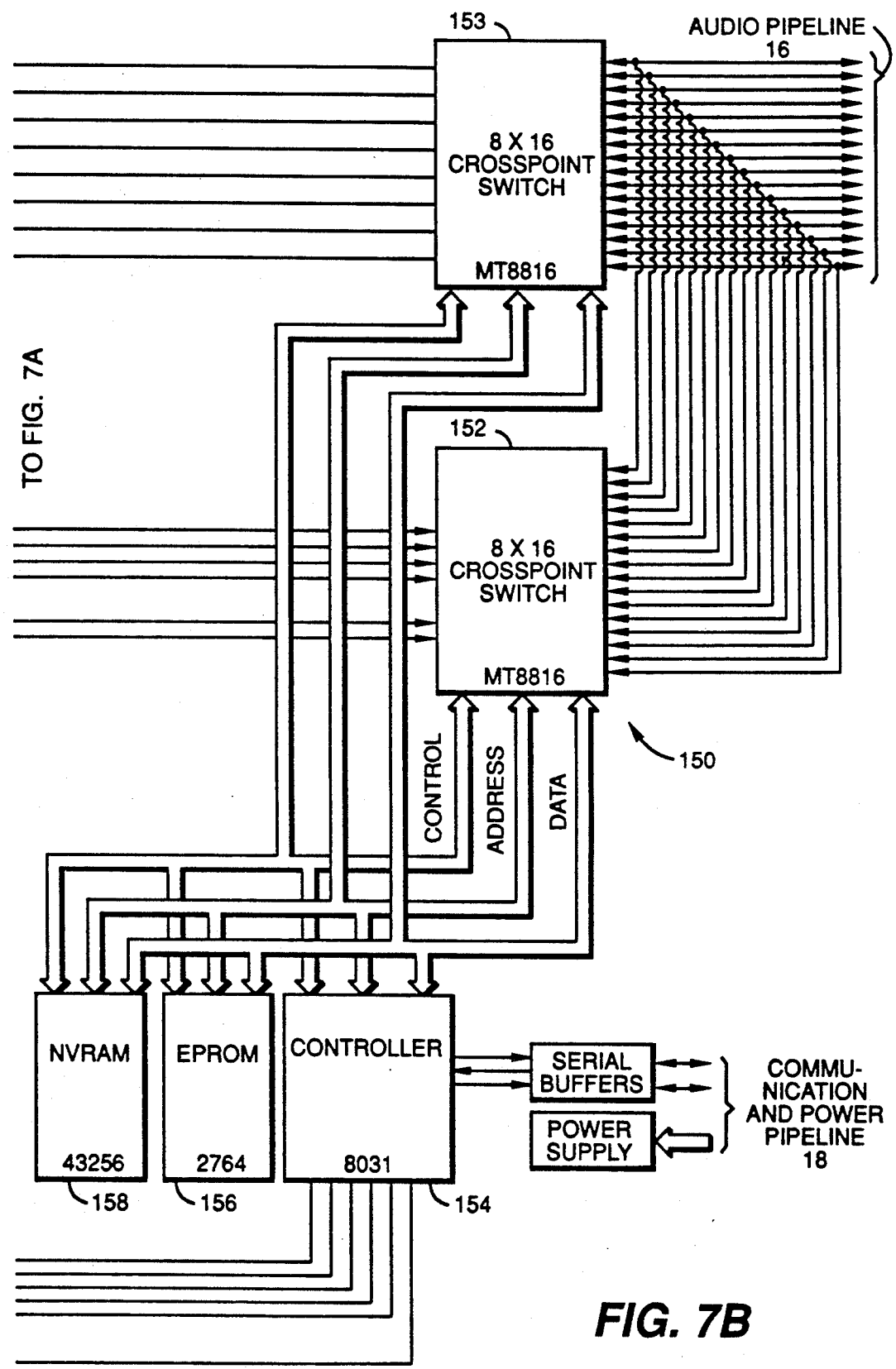

Audio controller 150 is shown in FIGS. 7A and 7B. The audio controller 150 is a function node that attaches to the interprocessor communications pipeline 18 and the audio pipeline 16 and is provided on a circuit card similar to the device controller cards 22. The audio controller 150 has audio crosspoint switches 152 and 153 controlled by microprocessor 154 for connecting audio signals to and from the devices 24 in different ways through their device cards 22 for transmission of audio signals among them as well as to and from the host microcomputer. The microprocessor 154 is also an 8051 series processor equipped with a BIOS EPROM 156 for network communications and a non-volatile RAM 158 for program memory. Audio input and output devices 160 and 162 are connected to the audio switches 152 and 153. A separate stereo amplifier 164 is connected to the audio switch 152 and the controller 154.

Figure 8A:
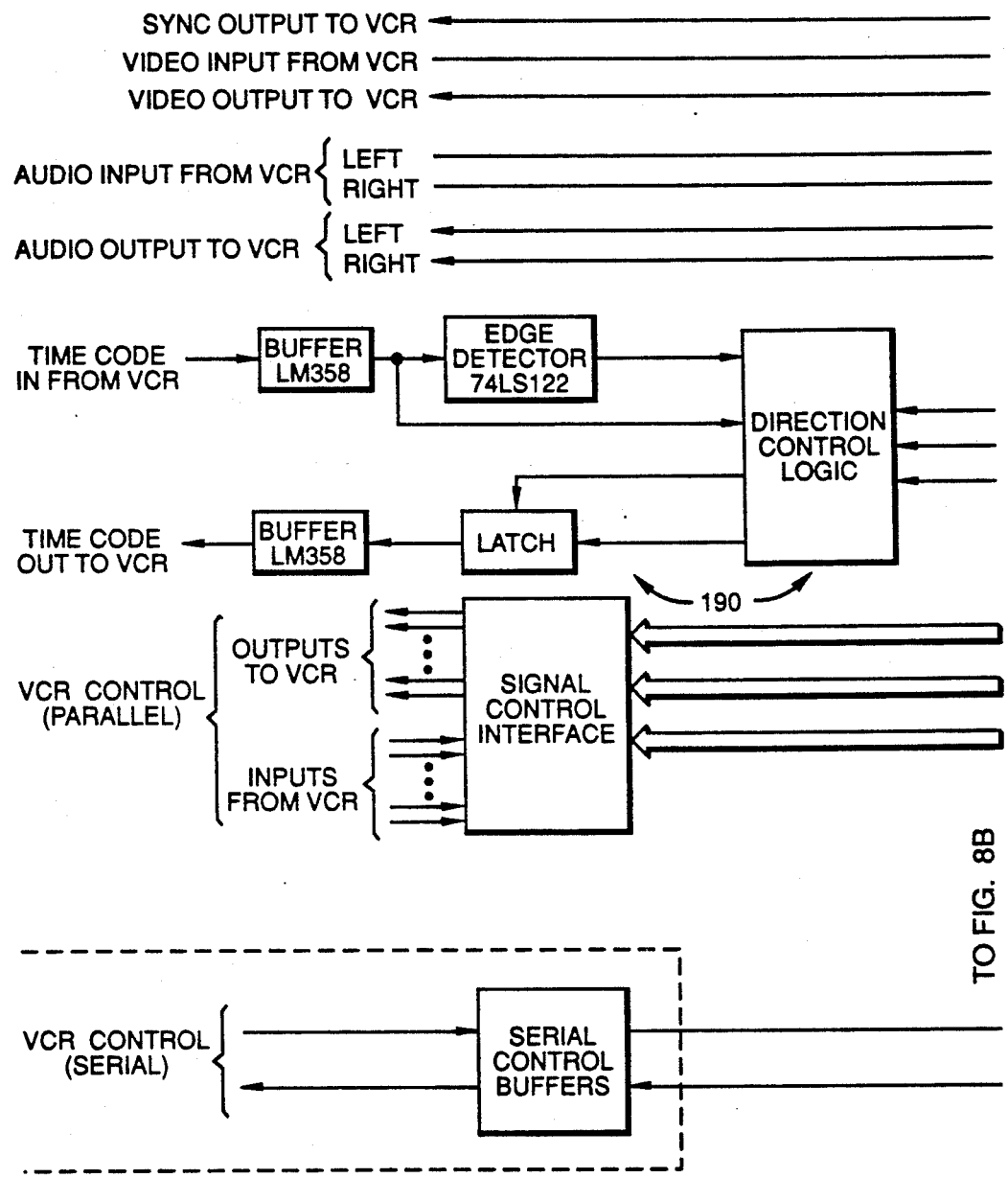
Figure 8B:
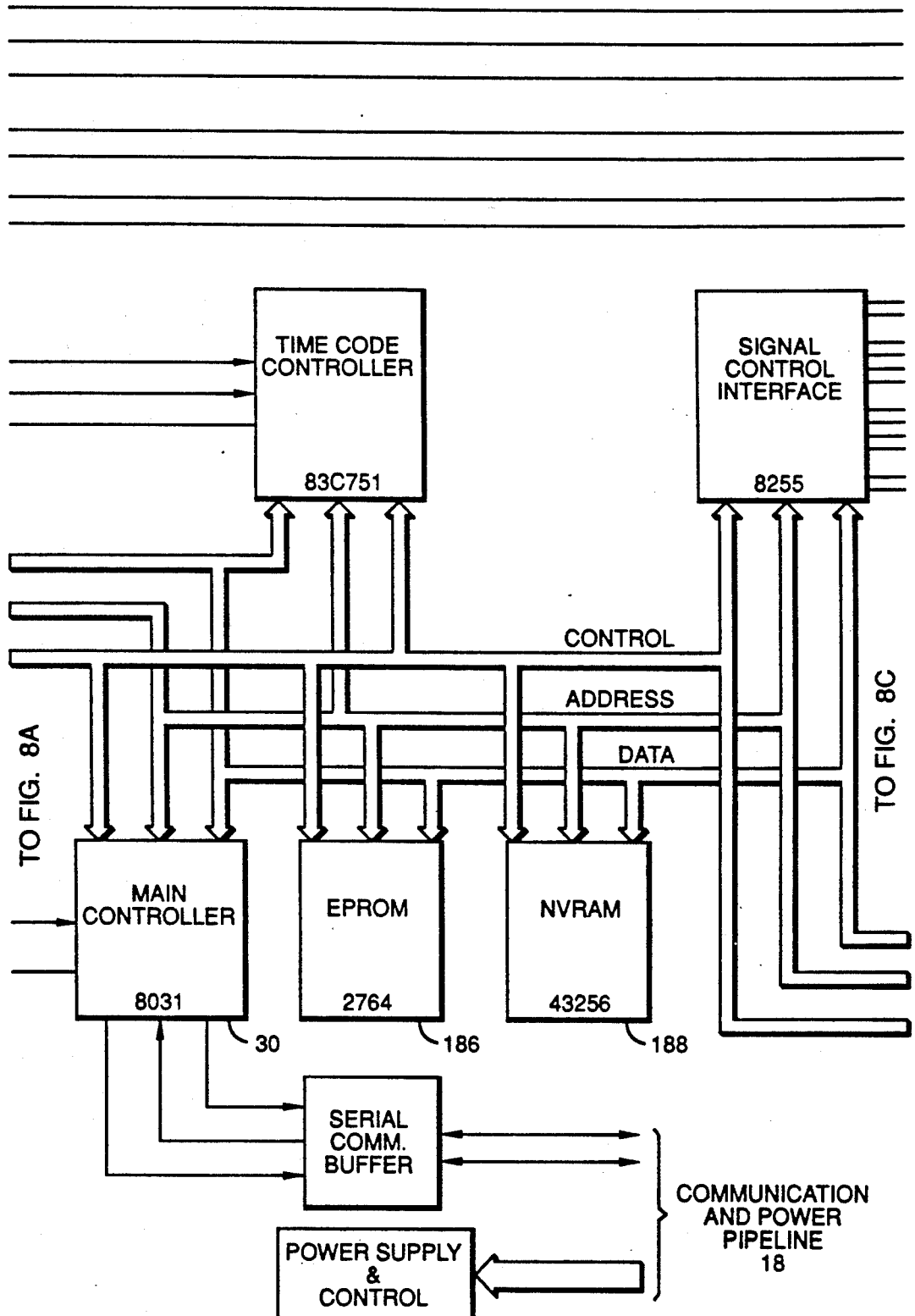
Figure 8C:
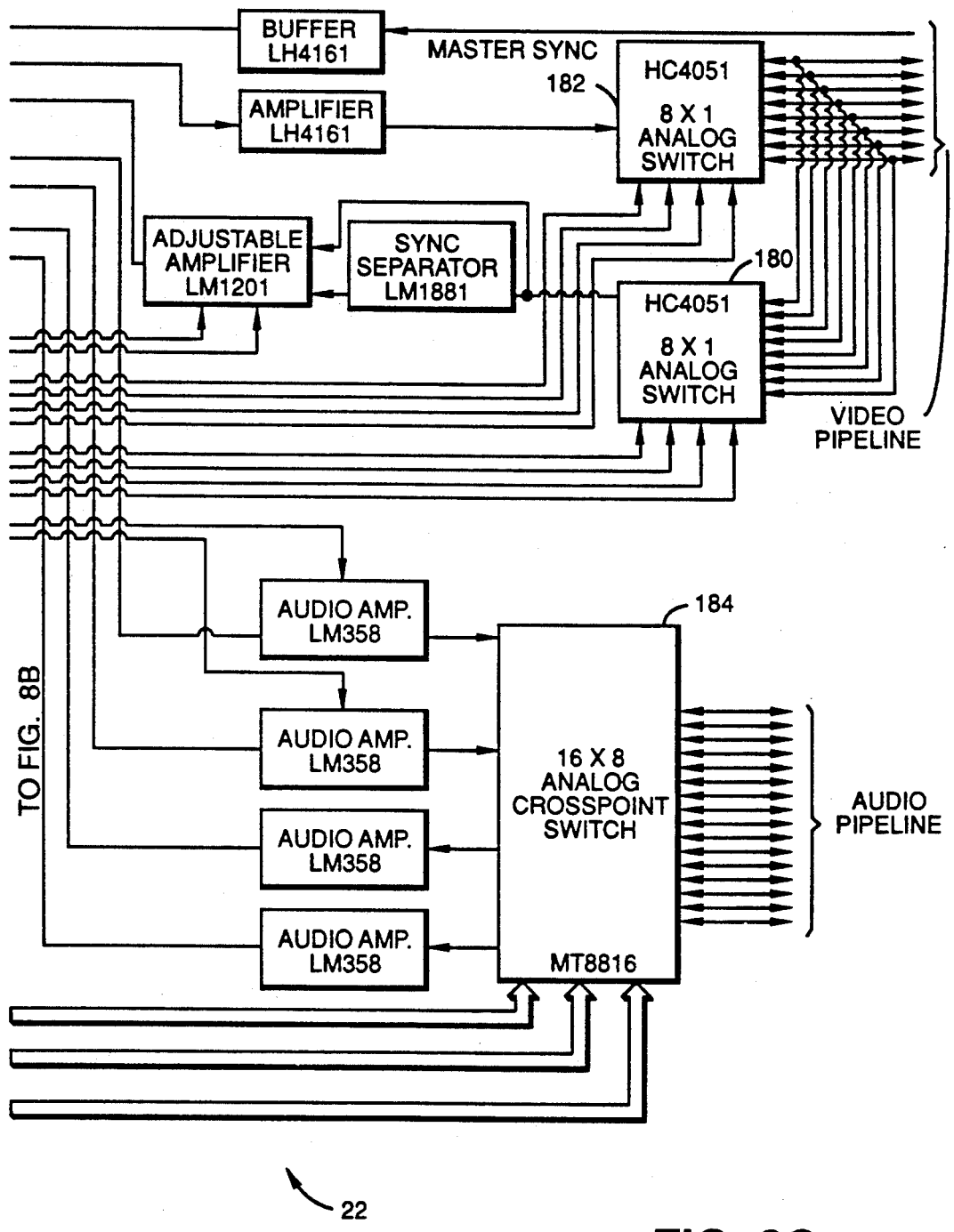

Circuits for a representative media device controller card 22 are shown in FIGS. 8A-8C, in the form of a VCR controller. The controller card 22 connects to the interprocessor communications pipeline 18, the video pipeline 14 and the audio pipeline 16. The controller 22 receives video and audio signals from the video and audio controllers 100 and 150 and supplies analog video signals to the VCR 24 and vice versa. The device controller 22 has video analog crosspoint switches 180 and 182 and audio analog crosspoint switch 184 controlled by microprocessor 30 for connecting video and audio signals to and from the devices 24 in different ways through their corresponding device cards 22 for transmission of video and audio signals among them as well as to and from the host microcomputer. The microprocessor 30 is also an 8051 series processor equipped with a BIOS EPROM 186 for network communications and a non-volatile RAM 188 for program memory. SMPTE time code read and write functionality is provided by circuits 190.

In the software driver for the system 10, a command interpreter is responsible for the management of the pipeline 12. When routing commands are received, the appropriate pipeline 12 assignments are made to accomplish that routing. It is the responsibility of the command interpreter to generate a pipeline overflow error should the number of routing requests exceed the pipeline 12 capacity.

The driver input command structure and syntax follow the following rules:
All Logical Devices are designated by one (1) to thirty-one (31) alpha characters, for example:
A
JVC
SONY
C
PANASONIC
Logical devices that have audio and video paths can be further identified by channel modifier enclosed in brackets [] or parentheses ().
C[V] Logical device C, video channel
SONY[A] Logical device SONY, both audio channel A and B
JVC(AB) Logical device JVC, audio channel B
The first task of the Driver is to map the Logical devices described in the input structure format into interprocessor serial control network addresses (physical addresses).
The Allowable Delimiter between device commands is: semicolon (;)
The Carriage Return (CR) is used to separate groups of commands to be processed by the system 10 at the same time. The system 10 will not begin parsing the command string into its various parts until it receives the "CR" character.
All Spaces, Line Feeds, and Tabs are ignored by the interpreter. These characters can be inserted in the command structure at will for readability.
Command Modifiers follow the command and are enclosed in Parenthesis () or brackets [].
Command Operands follow the command and precede the next command delimiter. All Command Operands are separated with commas.

Driver Input Command Set

Routing Commands CON: and DIS: follow similar rules. The CON: command requires two operands, the first being the "FROM" device, and the second being the destination device. The DIS: command uses the same "FROM"-"TO" operand ordering, but only the "FROM" device must be specified. A pipe 26 may be driven by a single video source routed to multiple destinations, but the video pipeline 14 must have only one source. The audio pipeline 16 does not have the same restriction.

CON: C, B;CON: B, D; is understood as "connect device C output to device B input, connect device B output to device D input". In this example, video and both audio channels are being routed together.

CON: B(A), C(A); CON: D[V], C[V]; is understood as "connect device B audio channels A and B to device C audio channels A and B, connect device D video to device C video".

CON: C(AA), B(AA), A[AA]; CON: C[AB], B(AB), D(AB); is understood as "connect device C: audio channel A output to device B: audio channel A input and device A: audio channel A: input, connect device C audio channel B output to device B audio channel B input and device D audio channel B input."

A switch routing remains in effect until a DIS: command is issued or GRE: resets all routings.

DIS: C, MON; (assuming for the moment that device C outputs have been connected to more than just the MON device) the DIS: command is understood as "disconnect device C outputs from the MON device leaving all other device C routings in effect."

DIS: C; is understood as "disconnect all device C: output routings". When an output routing is disconnected, the corresponding input(s) are also disconnected from the pipeline 12.

Driver Output Command Set

Routing Commands CON: and DIS: follow rules similar to the input command set. The CON: command requires three operands, the first being the "FROM" device or pipeline number, the second being the input or output [I/O], and the third is the destination device or pipeline. A video source device can be routed to multiple destinations, but a video destination can have only one source. Audio sources can have multiple destinations.

All routings must be called individually, meaning a video and two audio connects require three CON: commands. It is the responsibility of the driver to break the high level input routing commands into the individual audio and video routes. The process of assigning the necessary video and audio pipes 26 to affect the routing connections is the responsibility of the driver.

CON: 4[V],O,V[1]; is understood as "connect device at node 4 video output to video pipeline 1".

CON: V[1],I,5[V]; CON: A[4],I,5[A1]; CON: A[12],I,5-[A2]; is understood as "connect video pipeline to network device 5 video input, connect audio pipeline 4 to network device 5 audio input 1, connect audio pipeline 12 to network device 5 audio input 2".

CON: V[3],I,11 [V]; CON: A[6],I,21[A1]; CON: A[14-],I,21[A2]; is understood as "connect video pipeline 3 to network device 11 [video card (network node 1) device 1 is the MON1] video input, connect audio pipeline 6 to network device 21 [audio card (network node 2) device 1 is the MON1] audio input 1, connect audio pipeline 14 to network device 21 audio input 2".

A switch routing remains in affect until a DIS: command is issued or GRE: resets all routings.

DIS: V[3],1,1[V]; DIS: A[6],1,2[A1]; DIS: A[14],1,2-[A2]; is understood as "disconnect video pipeline 3 from network device 1 video input, disconnect audio pipeline 6 from network device 2 audio input 1, disconnect audio pipeline 14 from network device 2 audio input 2".

The output of the driver becomes the input command structure to the microprocessor 34 designated as the network controller. The network controller 34 then distributes the various routing commands to each of the microprocessors 30 connected to the interprocessor serial data communications bus 18. The individual microprocessors 30 connected to the interprocessor serial communications bus 18 reside on the various media device control boards 22 and thereby affect the various connections of the analog multiplexer switches.

The driver command set facilitates the use of a graphical interface. The graphical interface provides iconic representations of the various media devices 24 that may be connected to the system 10. Connections and disconnections can be made by pointing to the various icons with a computer pointing device, such as a mouse, light pen or other computer input device, and thus cause the implementation of the indicated audio and video connections. Further, the iconic representations may be tape or other media device locations or "addresses", index points, edit or switch control points or other relevant pictorial representations of devices, events or connections to occur at specific points in time.

It should further be apparent to those skilled in the art that various changes in form and details of the invention as shown and described may be made. It is intended that such changes be included within the spirit and scope of the claims appended hereto.

What is claimed is:

1. A system for interconnecting and mixing multiple audio and video data streams associated with multimedia devices, which comprises a host data processing system, a plurality of audio and video devices comprising the multimedia devices, a like plurality of media device communications boards for the audio and video data streams, each of said like plurality of media device communications boards being connected in an interprocessor control path and a signal transmission path between said host data processing system and one of said plurality of audio and video devices, each of said like plurality of media device communications boards having a control microprocessor, multiplex switching means controlled by said control microprocessor to switch the audio and video data streams, video bus connections, audio bus connections and interprocessor control connections, each of said like plurality of media device communications boards being connected by said video bus connections, said audio bus connections and said interprocessor control connections to a mother board, said mother board having a pipeline consisting of a video bus, an audio bus and an interprocessor control bus, said video bus connections of each of said like plurality of media device communications boards being connected to said video bus, said audio connections of each of said like plurality of media device communications boards being connected to said audio bus, said video bus and said audio bus each having a plurality of conductive pipes, and said interprocessor control connections of each of said like plurality of media device communications boards being connected to said interprocessor control bus, said mother board further including a master control microprocessor connected between said host data processing system and each control microprocessor of said like plurality of media device communications boards by said interprocessor control bus.

2. A system for interconnecting and mixing multiple audio and video data streams associated with multimedia devices, which comprises a host data processing system, a plurality of audio and video devices comprising the multimedia devices, a like plurality of media device communications boards for the audio and video data streams, each of said like plurality of media device communications boards being connected in an interprocessor control path and a signal transmission path between said host data processing system and one of said plurality of audio and video devices, each of said like plurality of media device communications boards having a control microprocessor, multiplex switching means controlled by said control microprocessor to switch the audio and video data streams, video bus connections, audio bus connections and interprocessor control connections, each of said like plurality of media device communications boards being connected by said video bus connections, said audio bus connections and said interprocessor control connections to a mother board, said mother board having a pipeline consisting of a video bus, an audio bus and an interprocessor control bus , said video bus connections of each of said like plurality of media device communications boards being connected to said video bus, said audio connections of each of said like plurality of media device communications boards being connected to said audio bus, and said interprocessor control connections of each of said like plurality of media device communications boards being connected to said interprocessor control bus, said mother board further including a master control microprocessor connected to said interprocessor control bus, said video bus, said audio bus and said interprocessor communications bus each consisting of a plurality of conductive pipes, with an interdigitated ground line between each pipe, on a first surface of said mother board and a ground plane on a second surface of said mother board spaced from and parallel to the first surface.

3. The system for interconnecting and mixing multiple audio and video data streams associated with multimedia devices of claim 2 additionally comprising an insulating layer on said conductive pipes and said interdigitated ground lines, and a second ground plane over said insulating layer.

4. The system for interconnecting and mixing multiple audio and video data streams associated with multimedia devices of claim 1 in which said data processing system includes a driver means for interconnecting said multiple video and audio devices in varying configurations through said multiplex switching means of each of said media device communications boards in response to user inputs supplied to said data processing system.

5. The system for interconnecting and mixing multiple audio and video data streams associated with multimedia devices of claim 1 in which said video bus and said audio bus are analog buses.

6. The system for interconnecting and mixing multiple audio and video data streams associated with multimedia devices of claim 1 in which said video bus and said audio bus are digital buses.

7. A method for interconnecting and mixing multiple audio and video data streams associated with multimedia devices, which comprises connecting the multimedia devices to a video pipeline, an audio pipeline and a control pipeline, each of the video pipeline and the audio pipeline having a plurality of parallel pipes, providing a software driver for managing physical connections of the multimedia devices to the video pipeline and the audio pipeline, accepting user inputs specifying which of the multimedia devices are to be connected together, connecting the multimedia devices together by the parallel pipes in accordance with the user inputs, with the physical connections of the multimedia devices to the parallel pipes of the video pipeline and the audio pipeline being made without requiring the user to know the physical connections, the user inputs being provided by use of icons and a computer pointing device, and providing the multiple audio and video data streams on different ones of the parallel pipes of the video pipeline and the audio pipeline.

8. The method of claim 7 additionally comprising the steps of providing a host data processing system connected to the control pipeline through a master controller and providing control processors connected between each of the multimedia devices and the control pipeline, and in which the software driver is provided to the master controller by downloading from the host data processing system.

* * * * *